June 1, 1926.

H. E. BRUNNER

BEARING MOUNTING

Filed Sept. 5, 1925

INVENTOR
Harold E. Brunner
BY Chas. Lyon Russell
HIS ATTORNEY

June 1, 1926.

H. E. BRUNNER

BEARING MOUNTING

Filed Sept. 5, 1925

INVENTOR
Harold E. Brunner
BY
HIS ATTORNEY

Patented June 1, 1926.

1,586,779

UNITED STATES PATENT OFFICE.

HAROLD E. BRUNNER, OF MAMARONECK, NEW YORK, ASSIGNOR TO THE SKAYEF BALL BEARING COMPANY, OF HARTFORD, CONNECTICUT, A CORPORATION OF CONNECTICUT.

BEARING MOUNTING.

Application filed September 5, 1925. Serial No. 54,654.

This invention relates to bearing housings, the purpose of the invention being to improve the life of an antifriction bearing when operating under radial load, by a mounting which will permit of easy assembling. In carrying out my invention a crown top is formed in the housing with a view of increasing the life of a bearing and, at the same time, reducing the extent of smearing which takes place where anti-friction bearings are mounted under present conditions.

The life of an anti-friction bearing under radial load is dependent upon the maxium load per roller. As an extreme condition one may consider a bearing with an excessive amount of radial looseness between races, the load will here be confined to a single roller. As another extreme a bearing without radial looseness and with an absolutely rigid support of the race against radial deflection, has been shown to distribute load over approximately one-fifth the number of rollers. The outer race is never sufficient to provide the required support in itself, and the housing must be utilized to compensate for this existing weakness. It must be realized that deflection of the outer race affects the load distribution among the rollers in a manner quite similar to radial play within the bearing.

One method of reinforcing the outer race against this detrimental deflection would be to employ a press fit between the outer race and the housing. This, however, would lead, in general, to undesirable complications in assembly and handling. In order to obtain the strengthening benefits of a pressed fit between outer race and housing and at the same time permit of ready assembly, the present invention was conceived. This consists of a crown provided in the housing for supporting the loaded arc of the outer race surface. The surface of this crown will be of a smaller radius than the surface of the outer ring, so that under load a support will be given to the ring similar to that obtained by a pressed fit. The crown will, in general, be less than 180°, say 150°, and initially before applying load the contact between race and housing will be at the extremities of the chord drawn across this arc of the crown. Under load the housing will deform, opening out until a full surface contact is established between the crown and outer race. In this way the structural stiffness of the housing is used to support the outer race of the bearing and obtain a broader distribution of load among the rollers. It is recognized that this support is similar to that obtained by a press fit, but it is also apparent that it has certain advantages over such a fit in that the greatest support is offered at the extremes of the loaded arc instead of being uniformly distributed along the entire surface. This condition favors the distribution of load within the bearing by supporting with greater pressure those rollers more remote from the plane of the load.

In certain applications of anti-friction bearings it is desirable or necessary to have an axial movement of the outer race within the housing while under load. The present invention is valuable in such cases since the specific pressure between outer race of the bearing and housing will be decreased by obtaining a broader distribution of load among the rollers. This will decrease the tendency of the housing to smear or abrade under the sliding axial movement of the bearing.

In preparing the seat within a housing, as for instance a journal box for receiving an anti-friction bearing, it is very difficult to form the seat with the exact curvature and shape of the outer perimeter of the bearing ring. Among the reasons for this is that the ring is finished by a grinding and polishing operation and the greatest amount of care is and can be observed in its construction, particularly owing to the manufacturing conditions and partly to the material from which is it made. On the other hand the housing is generally made of cast iron or cast steel and is of such bulky form and the housing surface is so located that it is quite difficult to obtain the same manufacturing refinements. In other words, if the bearing is a complete and perfect cylinder and the housing is a complete and perfect cylinder of a size sufficiently larger to permit the introduction of the bearing then the desired running condition will maintain. However, it is almost impossible to gain these exact conditions in practice. The presence of this crown extending inwardly from the wall of the box permits a system or method of mounting which is not permissible with a seat conforming to the entire perimeter of the bearing and closely approximating it in dimension.

In the accompanying drawings one practicable embodiment of the invention is illustrated, in which drawings.

My invention is illustrated herein as applied to a car axle journal box, 7, although it will be observed that it may also be used to advantage in other industries and in other types of housings. The box, 7, constitutes a housing for an anti-friction bearing, illustrated as a roller bearing, having an inner ring, 8, and an outer ring, 9, and two rows of rolling elements, 10, running upon surfaces formed upon these rings. The inner face, 11, of the housing is substantially cylindrical and of a radius slightly larger than that of the outer perimeter of the bearing ring, 9.

At the upper portion of the box a crown, 12, is formed occupying less than 180°. In this type of bearing preferably about 150° will give satisfactory service. The crown is shown somewhat wider than the bearing ring. This width is to permit weaving of the box on the journal, or in other words, lateral sliding of the ring within the housing. The sliding movement in one direction is governed by a flange, 13, in this illustration, sliding in the oppositive direction, of course, being controlled by a similar flange on the box at the other end of the axle.

It is to be understood that the bearings are mounted according to the prevailing practice which permits lateral movement as the car swings from side to side and also a slow rotation or creeping of the bearings. Sometimes this creeping movement is quite extensive, at others it is practically non-existent. Nevertheless, the structure is such that the creeping may take place if conditions exist which normally tend to induce it.

Figure 1:
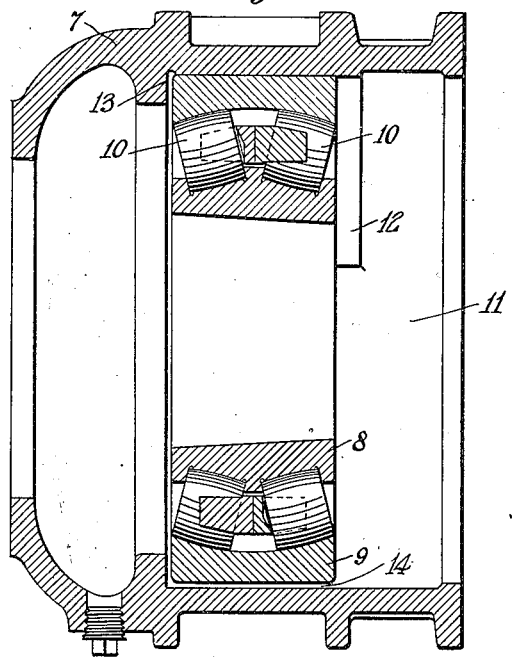
Figure 1 is a central longitudinal section of the journal box and of a roller bearing shown mounted therein.
Figure 2:
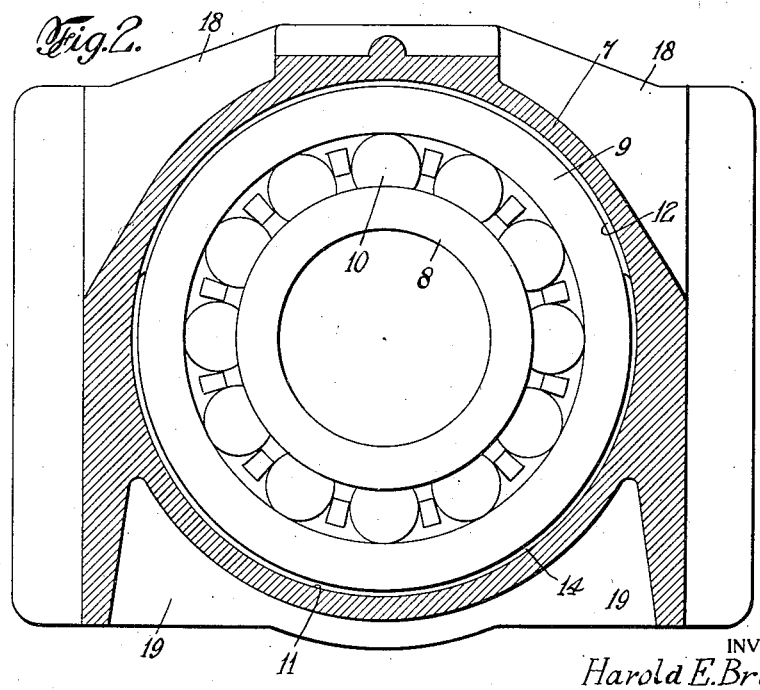
Fig. 2 is a central cross sectional view of the box illustrated in Fig. 1, the bearing being shown in elevation.
Figure 3:
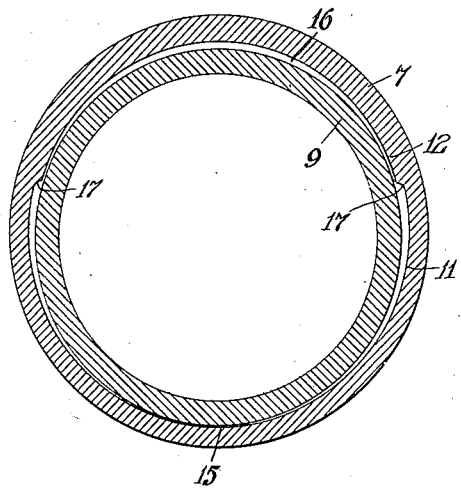
Figs. 3, 4 and 5 are cross sectional details illustrating the principal steps in assembling the bearing within the box.
Figure 5:
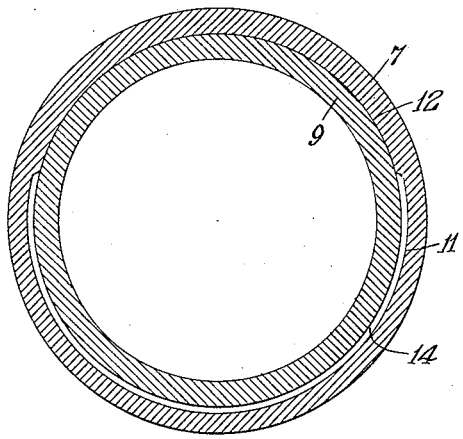

By reference to the drawings, particularly Figures 1, 2 and 5, it will be seen that there is, when the bearing is in position, an amount of free space, 14, between the lower portion and the sides of the outer ring and the housing pad, 11. This permits the easy introduction of the bearing into its intended position. The bearing mounted upon the end of a shaft is inserted through the larger or right hand end in Figure 1 of the housing and toward the bottom as illustrated in Figure 3. So, if care is observed the bearing does not touch any portion of the housing, or may if desired be permitted to move along or adjacent the bottom portion of the housing, cutting down the free space indicated at 15, in Figure 3.

Figure 4:
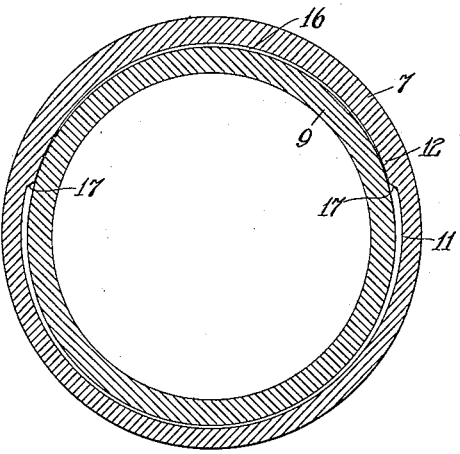

After the outer ring, 9, has been brought up against or near the flange, 13, load is applied to the journal box. During the first portion of which application the parts assume the Figure 4 position, the lower edges, 17, of the crown engaging the perimeter of the outer ring thus cutting down the space, 16, illustrated in Figure 3 materially as seen in this view.

The further application of load stresses the metal of the journal box, and owing to the elasticity of its construction it assumes the position shown in Figures 5 and 2 where there is a complete surface contact over the crown where it embraces the bearing ring. For the purpose of preventing undue fixture of the box supporting webs, 18 and 19, are cast integrally with it.

The radius of the arc of the crown is preferably the same as the radius of the outer surface of the bearing ring or slightly smaller. In either case there will be, of course, a certain stretching when the bearing is introduced into the seat formed by the crown.

The difference between the diameter of the outer ring and the diameter of the cylindrical surface of the crown is one of those which will have to be measured by a micrometer, and might be called a micrometer dimension. In sizes used for railway car journals the difference would be preferably from one to five one thousandths of an inch.

Claims:

1. A bearing housing having at its upper portion a crown, the surface thereof formed as a hollow cylindrical face of less than 180°, and an anti-friction bearing mounted on such crown the surface of the outer ring of the bearing being formed as a cylinder of greater radius than the radius of the crown, the elasticity of the housing permitting a complete surface contact with the bearing ring over the crown upon the application of load.

2. A bearing housing having at its upper portion a crown, the surface of which being formed as a hollow cylindrical face of less than 180°, and an anti-friction bearing the surface of its outer ring formed as a cylinder and mounted on such crown, the radius of the ring being greater by a micrometer dimension than the radius of the crown, the elasticity of the housing permitting a complete surface contact with the bearing ring over the crown upon the application of load.

Signed at the city of New York, New York, this 3rd day of September, 1925.

HAROLD E. BRUNNER.